April 30, 1946. F. W. GODSEY, JR 2,399,343
MAGNETIC HOUSING FOR ELECTROMAGNETIC DEVICES
Filed Feb. 15, 1943

WITNESSES:
Wm. B. Sellers
Earnest F. Oberheim

INVENTOR
Frank W. Godsey, Jr.
BY
Paul E. Friedemann
ATTORNEY

Patented Apr. 30, 1946

2,399,343

UNITED STATES PATENT OFFICE 2,399,343

MAGNETIC HOUSING FOR ELECTRO-
MAGNETIC DEVICES

Frank W. Godsey, Jr., Wilkinsburg, Pa., assignor to Westinghouse Electric Corporation, East Pittsburgh, Pa., a corporation of Pennsylvania Application February 15, 1943, Serial No. 475,939

8 Claims. (Cl. 73—136)

The present invention relates generally to electromagnetic devices, and more particularly to a magnetic type of magnetizing coil housing for electromagnetic devices of a character adapted to indicate stresses and strains of rotating shafts.

The present invention is closely related to applicant's copending applications Serial No. 455,258 and Serial No. 458,379, now Patent 2,349,653, issued May 23, 1944, respectively entitled, Power measuring device for rotating shafts and Thrust measuring device for shafts, and a copending application of B. F. Langer and F. W. Godsey, Jr., Serial No. 458,378, entitled Torque measuring devices for shafts.

This invention as hereinafter disclosed is specifically illustrated in the drawing as being applied to a device for measuring or indicating the torque of a shaft. However, it will be apparent to one skilled in the art that the present invention is applicable to any type of annular magnetizing coil wherein a concentrated flow of magnetic flux is desired.

In many applications of electromagnetic devices, particularly those employed to measure any one of torque, power or thrust in airplane propeller shafts, space and weight limitations are of such a nature that the measuring devices must be as compactly designed and as light in weight as possible. In the past, coil housings have largely contributed to the size and weight of the measuring device due to their rather massive construction which was required to obtain the desired magnetic and electrical characteristics.

A principal object of the present invention is to provide a magnetic housing for an annular magnetizing coil which is light in weight, requires a minimum of space and has good characteristics for flows of magnetic flux.

Another object of the present invention is to provide a magnetic housing for an annular magnetizing coil which will have low magnetic and electrical losses in operation.

A specific object of the present invention is to provide an easily manufactured magnetic housing of the character referred to which is formed of sheet magnetic material.

A further specific object of the present invention is to provide a magnetic housing of the character referred to having several elements drawn of sheet magnetic material which may be assembled about a magnetizing coil and the several elements shrunk to engage one another to form a rigid, coherent unitary structure.

Other objects and advantages will become more apparent from a study of the following disclosure when considered in conjunction with the accompanying drawing in which.

Figure 1:
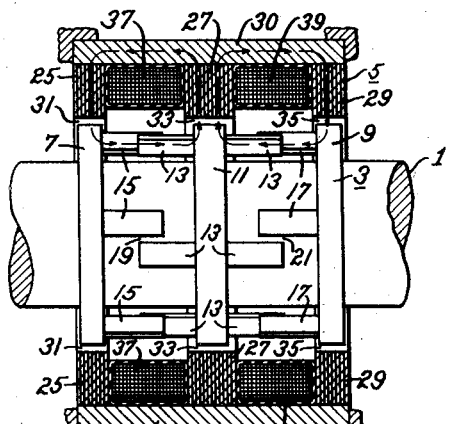
Figure 1 is a longitudinal cross-sectional view of an electromagnetic torque measuring device illustrating the type of coil housing used in the past.

Referring now to Fig. 1 of the drawing, the specific torque measuring device herein illustrated is described in the previously mentioned copending application of B. F. Langer and F. W. Godsey, Jr., Serial No. 458,378, entitled Torque measuring devices for shafts, and only such description which is necessary for a complete understanding of the construction and operation of the device will be included in this specification. It will also be noted upon an inspection of the various figures of the drawing that descriptive material relating to the operation of the device of Fig. 1 will apply to all the figures, since the fundamental principles of operation are the same in each case.

In Fig. 1, numeral 1 denotes a shaft, the torque of which is to be measured; numeral 3 denotes a rotor assembly secured to the shaft; and numeral 5 denotes a stationary member having ring members which are concentrically positioned about the rotor assembly 3.

The rotor assembly 3 comprises a pair of axially spaced torque rings 7 and 9 secured to the shaft on bushings (not shown) of nonmagnetic material so that a circulating magnetic flux will not include the shaft if the shaft is made of steel or other magnetic material. Centrally disposed between the torque rings 7 and 9 is a third ring 11 termed a reference ring likewise supported and secured to the shaft on a bushing (not shown) of nonmagnetic material. The three rings thus secured to the shaft are so axially spaced and supported that a known gauge length of shaft is included therebetween.

Figure 6:
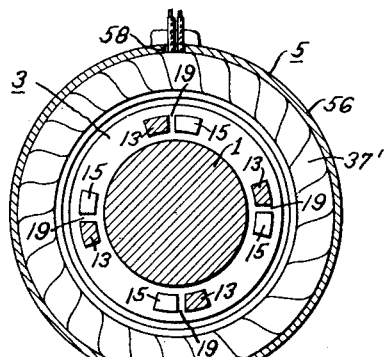
Fig. 6 is a sectional view taken on the line VI—VI of Fig. 5.

The reference ring 11 has secured thereto a plurality of axially extending fingers 13 which extend axially on each side of the ring in the same axial plane. Each of the torque rings 7 and 9 have a plurality of axially extending fingers 15 and 17 which are of sufficient length to overlap the extremities of the fingers 13 associated with reference ring 11. The confronting faces of the cooperating fingers are so positioned during assembly that a small air gap is included therebetween as shown in Fig. 6, and the above described assembly is such that, for example, if torque were assumed to be transferred from left to right of the shaft in a clockwise direction, torsional deflections of the shaft between the torque ring 7 and the reference ring 11 would so displace the fingers 15 relative to the fingers 13 cooperating therewith that the air gap 19 formed therebetween would be decreased and the torsional deflections of the shaft between reference ring 11 and torque ring 9 would so displace the fingers 17 relative to the fingers 13 cooperating therewith that the air gap 21 formed therebetween would be increased.

The stationary member 5 comprises the three laminated ring elements 25—27 and 29 which are axially spaced within the outer shell 30 and the entire assembly is concentrically disposed about the rotor assembly so that each of the rings included in the rotor assembly has a laminated ring concentrically disposed thereabout. The inner bores of the laminated rings are of such diameter that small circular air gaps 31, 33 and 35 are formed between the confronting surfaces of the concentrically disposed rings. The annular coils 37 and 39 are positioned within the annular recesses formed between each of the laminated rings and may be connected by means of any suitable metering circuit to a source of alternating potential whereby the coils may be energized with an alternating potential. Thus a flow of alternating magnetic flux may be induced to flow in the stationary member 5 and the rotor assembly 3 in the instantaneous directions indicated by the arrows and for zero torque of the shaft the impedances or voltages of the coils are matched. Upon torsional deflection of the shaft due to clockwise torque from left to right of the shaft as previously described, air gaps 19 will be decreased while air gaps 21 will be increased to substantially proportionally change the value of an alternating magnetic flux associated with each of the coils whereby the impedance or voltages of the coils is changed, the impedance or voltage of one coil increasing while the impedance or voltage of the other decreases in an amount indicative of the torque of the shaft.

In order to obtain a low resistance path for a flow of magnetic flux, it is desirable that the area of the circular air gaps for some predetermined spacing of the elements forming the air gaps be of some suitable value which will provide a substantially lower resistance to the flow of a magnetic flux than the air gaps 19 and 21. Since the diameters of the confronting surfaces are relatively fixed due to overall size limitations, desired face areas are more conveniently obtained by changing the axial length of the faces forming the circular gaps. Further, in order to prevent changes in the areas of the confronting faces due to relative axial shift of the stationary member 5 and rotor assembly 3, the axial length of one of the confronting faces should be greater than that of the cooperating face. In the instant application the ring elements of the magnetic housing have the greater axial length. The type of construction illustrated in Fig. 1, satisfying the above requirements results in a relatively heavy construction. Since the cross-sectional area of the material conducting the flux need be but a fraction of the gap area, a measurable saving in weight and reduction in size is obtainable by keeping the flux conducting areas of the magnetic material at a minimum. It will be noted that with the construction of Fig. 1 a large portion of the magnetic housing and coil assembly is taken up with relatively inefficiently used magnetic material, resulting in a limitation of the space available for the magnetizing coils. With the construction of Fig. 2 which efficiently utilizes the magnetic material in the housing, an increase in available coil space is obtained and the coil size may be increased, that is, provided with more turns. Thus for a given size of torque measuring device it is possible to obtain a larger change in coil impedance or voltage for a given change in magnetic flux and hence, greater sensitivity. If higher sensitivity of the device is not required, for a given coil size as, for example, the coil size of Fig. 1, a considerable reduction in size of the torque measuring device is obtainable.

In practicing the present invention, it is desirable to use material in the construction of the magnetic housing having good magnetic qualities, such as, for example, Hypernic. It is thus possible to construct a magnetic housing of relatively thin sheet material which will satisfy the requirements of this specific application.

Figure 2:
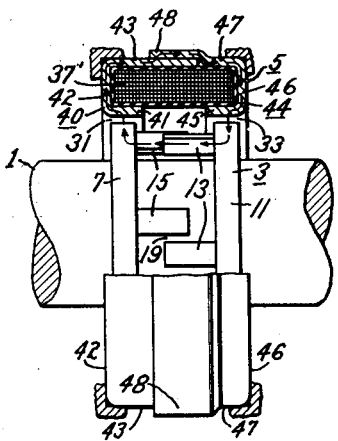
Fig. 2 is a partial longitudinal section of a torque measuring device having a single annular coil enclosed by a magnetic housing embodying the principles of this invention.

Fig. 2 illustrates a form of torque measuring device utilizing a single annular coil. The fundamental operation of this device is the same as for one-half of Fig. 1. Numeral 40 designates a ring element drawn of sheet magnetic material which is adapted to enclose an end of the coil 37'. The ring element 40 may generally be described as having somewhat of a channel shaped cross-section with an inner peripheral face 41, a transverse face 42, and an outer peripheral face 43 forming this channel shape. The inner peripheral face 41 is of such character as to axially overhang the torque ring associated therewith and of such diameter as to concentrically encircle the associated torque ring with a predetermined air gap therebetween. The outer peripheral surface 43 is preferably so spaced from the inner peripheral face 41 by the transverse face 42 that the coil section is snugly enclosed therewithin. A second ring element 44 similar to ring element 40 provided with an inner peripheral face 45, a transverse face 46, and an outer peripheral face 47, encloses the opposite end of the coil 37' and is provided with a drawn surface 48 a continuation of its outer peripheral face 47 which is adapted to overlap the extremity of the outer face 43 of the ring element 40. The assembly is then preferably accomplished by heating and expanding the surface 48 so that it easily slides into position over the outer face 43 whence it shrinks upon cooling to securely engage the ring element 40. The joint thus made provides excellent magnetic qualities for the flow of a magnetic flux. The magnetic circuit thus completed is indicated by the arrows.

Figure 3:
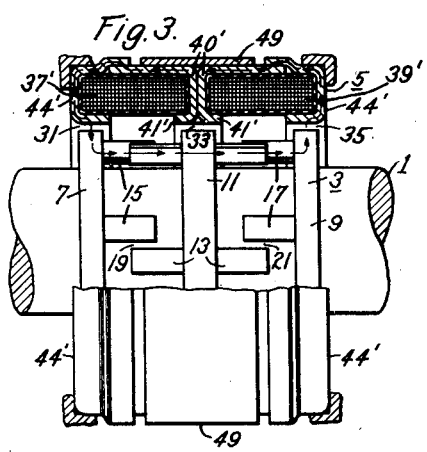
Fig. 3 is a partial longitudinal section of a torque measuring device having two annular coils enclosed by a magnetic housing embodying the principles of this invention.

Fig. 3 utilizes the magnetic housing of Fig. 2 in a torque measuring device having two coaxially positioned annular coils 37' and 39'. The ring elements 44' in this application are substantially duplicates of the ring 44 of Fig. 2. The abutting ring elements 40', however, have been modified in that the inner peripheral faces 41' have been axially shortened as required in this assembly.

The two coil housings are securely joined by means of the sleeve 49 which is shrunk about the abutting ring elements 40'. An instantaneous flux condition for zero torque is indicated by the arrows and is easily obtained by suitable energization of the coils. When torque occurs an unbalanced magnetic flux will flow through the reference ring 11 thus increasing the density of a magnetic flux linked with one coil while decreasing a magnetic flux linked with the other to correspondingly change the coil impedance.

Figure 4:
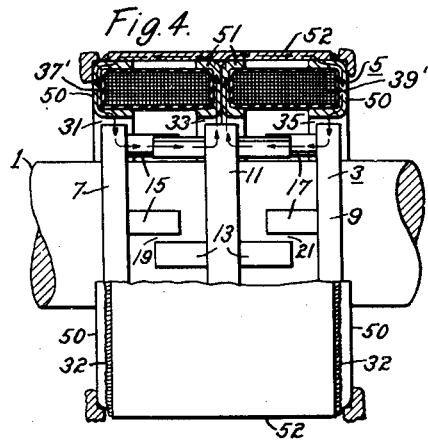
Fig. 4 is a partial longitudinal section of a torque measuring device having a modified form of the magnetic housing illustrated in Fig. 3.

Fig. 3 may be modified as indicated in Fig. 4 in which the ring elements 50 and 51 enclosing the ends of the coils 37' and 39' are of U-shaped cross-section and the abutting coil assembly is securely enclosed as a rigid, coherent structure by means of a sleeve or shell 52 which is shrunk about the other peripheral surfaces of the ring elements. In some instances, it may be desirable to tack weld or run a continuous weld 32 at the extremities of the sleeve to positively join the ring elements 50 to the sleeve 52.

Figure 5:
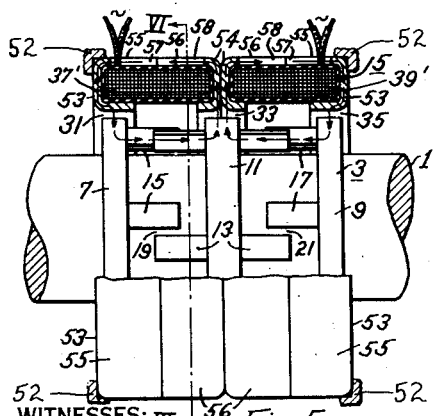
Fig. 5 is a further modification of the invention illustrated in Fig. 3.

In applications wherein the magnetic coil housing may be conveniently mounted to have a compression load applied thereto axially of the housing for the purpose of holding the housing sections together, a structure of the nature illustrated in Figs. 5 and 6 may be employed. In this application the ring elements 53 and 54 are so arranged that upon enclosing the coils 37' and 39' the extremities of their outer peripheral surfaces 55 and 56 are maintained in positive abutting relation by the members 52 which may comprise for example portions of the shaft housing of a motor. Thus a magnetic circuit is completed and an instantaneous magnetic flux condition may be as indicated by the arrows. The coil leads may be brought out through slots 57 and 58 in the outer peripheral surfaces.

Fig. 6, while specifically showing the arrangement of parts in Fig. 5, may also serve in connection with the other figures of the drawing particularly with reference to the rotor assembly 3.

From the foregoing, it will be apparent that applicant has provided a magnetic coil housing which provides distinct advantages over the construction used in the past and which fulfills the requirements necessary for satisfactory operation. The present invention by means of its novel construction makes possible a measurable reduction in size and weight of the apparatus involved, or, if shaft operating conditions permit, for a given torque ring spacing, a coil having more wire turns may be used resulting in an increased flux linkage and consequently a larger impedance or voltage change in the coil for a given magnetic flux change.

The foregoing disclosure and the showings made in the drawing are merely illustrative of the principles of this invention and are not to be considered in a limiting sense. The only limitations are to be determined from the scope of the appended claims.

I claim as my invention:

1. Apparatus for indicating the torque of a shaft comprising, in combination, a rotor assembly secured to rotate with said shaft, an annular stationary magnetizing coil associated with said rotor assembly, a magnetic housing for said magnetizing coil, means for supplying an alternating current for energizing said magnetizing coil, said magnetic housing comprising a pair of interconnected annular members each formed of a single piece of sheet magnetic material, said annular members being each disposed adjacent an end of said coil and having portions thereon positioned in close proximity to conforming portions of said rotor assembly whereby an alternating magnetic flux induced by said magnetizing coil may flow in said rotor assembly and said magnetic housing, means included in said rotor assembly adapted to alter the value of said alternating magnetic flux in an amount corresponding to the torsional deflections of said shaft due to torque thereby altering the value of a voltage in said magnetizing coil in an amount indicative of the torque of said shaft.

2. Apparatus for indicating the torque of a shaft comprising, in combination, a rotor assembly secured to rotate with said shaft, an annular stationary magnetizing coil associated with said rotor assembly, a magnetic housing for said magnetizing coil, means for supplying an alternating current for energizing said magnetizing coil, said magnetic housing comprising a pair of interconnected annular members each formed of a single piece of sheet magnetic material, each of said annular members having a transverse face and an inner peripheral face adjacent said transverse face, the transverse face of each of said annular members being disposed adjacent the ends of said magnetizing coil, and said inner peripheral faces being concentrically disposed in close proximity to peripheral portions of said rotor assembly whereby a magnetic flux path associated with said magnetizing coil, including said rotor assembly and said magnetic housing is completed, means included in said rotor assembly adapted to alter the value of an alternating magnetic flux induced in said magnetic flux path upon energization of said magnetizing coil, said flux being altered in an amount corresponding to the torsional deflections of said shaft thereby altering the value of a voltage in said magnetizing coil in an amount proportional to the torque of said shaft.

3. Apparatus for indicating the torque of a shaft comprising, in combination, a rotor assembly secured to rotate with said shaft, an annular stationary magnetizing coil associated with said rotor assembly, a magnetic housing for said magnetizing coil, means for supplying an alternating current for energizing said magnetizing coil, said magnetic housing comprising a pair of interconnected annular members each drawn of a single piece of sheet magnetic material such that each of said annular members is provided with a transverse surface, an inner peripheral surface and an outer peripheral surface, one of said annular members having the transverse surface thereof disposed adjacent one end of said coil and the inner peripheral surface thereof concentrically disposed in close proximity to conforming portions of said rotor assembly, the other of said annular members having the transverse surface thereof disposed adjacent the other end of said coil and the inner peripheral surface thereof concentrically disposed in close proximity to conforming portions of said rotor assembly, means of magnetic material interconnecting the outer peripheral surfaces of said annular members whereby a magnetic flux path associated with said magnetizing coil, including said rotor assembly and said magnetic housing is completed, means included in said rotor assembly adapted to alter the value of an alternating magnetic flux induced in said magnetic flux path upon energization of said magnetizing coil, said flux being altered in an amount corresponding to the torsional deflections of said shaft thereby altering the value of a voltage in said magnetizing coil in an amount proportional to the torque of said shaft.

4. An electromagnetic device comprising, in combination, a plurality of coaxially disposed annular magnetizing coils, means for supplying an alternating current for energizing said coils, a magnetic housing for said magnetizing coils, said magnetic housing comprising a plurality of interconnected annular members each drawn of a single piece of sheet magnetic material to conform to the configuration of the ends of said coils, each of said coils having one of said annular members coaxially disposed adjacent each end thereof, a core assembly having cylindrical surfaces thereof concentrically disposed in close proximity to conforming portions of said annular members whereby each of said magnetizing coils has a magnetic flux path including a portion of said core assembly and the annular members associated therewith, relatively movable means included in said core assembly adapted to alter the value of a magnetic flux in the magnetic flux paths associated with each of said magnetizing coils in an amount corresponding to the relative movement thereof whereby the value of a voltage in each of said magnetizing coils is altered in an amount indicative of such movement.

5. An electromagnetic device comprising, in combination, a stationary annular magnetizing coil, means for supplying an alternating current for energizing said coil, a cylindrical core assembly having relatively movable magnetic elements, said cylindrical core assembly being concentrically disposed relative to said magnetizing coil, a magnetic housing for said magnetizing coil, said magnetic housing including a pair of interconnected ring-like members each formed of a single piece of sheet magnetic material, each of said ring-like members being provided with an inner peripheral surface, said ring-like members being disposed adjacent opposite ends of said coil with the inner peripheral surfaces thereof concentrically disposed in close proximity to conforming portions of said core assembly whereby a magnetic flux path associated with said magnetizing coil is completed, said relatively movable elements in said core assembly altering the value of a magnetic flux linked with said magnetizing coil in an amount corresponding to the relative movement thereof whereby a voltage in said magnetizing coil is altered in an amount proportional to said relative movement.

6. An electromagnetic device comprising, in combination, a stationary annular magnetizing coil, means for supplying an alternating current for energizing said coil, a cylindrical core assembly having relatively movable magnetic elements, said cylindrical core assembly being concentrically disposed within said magnetizing coil, a magnetic housing for said magnetizing coil, said magnetic housing including a pair of interconnected ring-like members each formed of a single piece of sheet magnetic material, each of said ring-like members being provided with an inner peripheral surface, said ring-like members being disposed adjacent opposite ends of said coil with the inner peripheral surfaces thereof concentrically disposed in close proximity to conforming portions of said core assembly whereby a magnetic flux path associated with said magnetizing coil is completed, said relatively movable elements in said core assembly altering the value of a magnetic flux linked with said magnetizing coil in an amount corresponding to the relative movement thereof whereby a voltage in said magnetizing coil is altered in an amount proportional to said relative movement.

7. A magnetic coil assembly comprising, in combination, an annular magnetizing coil, a variable reluctance rotor assembly concentrically disposed therewithin, a pair of annular members, each of said members being drawn from a single piece of sheet magnetic material such that each is provided with an inner peripheral face and a transverse face which is a single piece continuation of said inner peripheral face, one of said annular members having the transverse face thereof disposed against one end of said coil, the other of said annular members having the transverse face thereof disposed against the other end of said coil such that said annular members have the inner peripheral faces thereof positioned within said coil in concentric relation with peripheral portions of said rotor assembly such that small continuous circular air gaps are formed therebetween, and means of magnetic material interconnecting said annular members whereby a magnetic flux path comprising said rotor assembly, one of said annular members, said means interconnecting said annular members and the other of said annular members is completed.

8. A magnetic coil assembly comprising, in combination, an annular magnetizing coil, a variable reluctance rotor assembly concentrically disposed therewithin, a pair of channel-shaped annular members each formed from a single piece of sheet magnetic material and enclosing the ends of said coil such that an inner peripheral surface of each of said annular members formed by one side of their channel sections is concentrically positioned in close proximity to peripheral portions of said rotor assembly and forms a continuous peripheral flux path adjacent the rotor assembly, the outer peripheral surfaces of said annular members formed by the other side of their channel sections overlapping, one of said annular members having the overlapping portion thereof shrunk into engagement with the other of said annular members such that a magnetic flux path associated with said coil including said rotor assembly and said annular members is completed.

FRANK W. GODSEY, Jr.